(12) United States Patent
Chen et al.

(10) Patent No.: US 11,633,857 B2
(45) Date of Patent: Apr. 25, 2023

(54) METHOD FOR PICKING UP AN OBJECT FROM A BIN

(71) Applicant: SOLOMON TECHNOLOGY CORPORATION, Taipei (TW)

(72) Inventors: Cheng-Lung Chen, Taipei (TW); Xuan Loc Nguyen, Taipei (TW); Tsung-Cheng Lai, Taipei (TW); Dowei Chiang, Taipei (TW); Ching-Lung Yu, Taipei (TW)

(73) Assignee: SOLOMON TECHNOLOGY CORPORATION, Taipei (TW)

( * ) Notice: Subject to any disclaimer, the term of this patent is extended or adjusted under 35 U.S.C. 154(b) by 254 days.

(21) Appl. No.: 17/081,818

(22) Filed: Oct. 27, 2020

(65) Prior Publication Data
US 2022/0126446 A1 Apr. 28, 2022

(51) Int. Cl.
| | |
|---|---|
| B25J 9/16 | (2006.01) |
| B25J 13/08 | (2006.01) |
| B25J 15/00 | (2006.01) |
| B25J 15/06 | (2006.01) |
| G05B 19/4155 | (2006.01) |
| G05B 19/406 | (2006.01) |

(Continued)

(52) U.S. Cl.
CPC ........... *B25J 9/1669* (2013.01); *B25J 9/1697* (2013.01); *B25J 13/08* (2013.01); *B25J 15/0066* (2013.01); *B25J 15/0616* (2013.01); *G05B 19/406* (2013.01); *G05B 19/4155* (2013.01); *G06V 20/10* (2022.01); *G06V 20/64* (2022.01); *G05B 2219/31305* (2013.01)

(58) Field of Classification Search
CPC ...... B25J 9/1669; B25J 9/1697; B25J 9/1664; B25J 13/08; B25J 15/0066; B25J 15/0616; B25J 9/1612; G05B 19/406; G05B 19/4155; G05B 2219/40053; G05B 2219/31305; G05B 2219/45063; G05B 2219/40079; G05B 2219/31036; G05B 2219/40537; G05B 2219/39107
See application file for complete search history.

(56) References Cited

U.S. PATENT DOCUMENTS

| | | | |
|---|---|---|---|
| 2014/0121836 A1* | 5/2014 | Ban ..................... | B25J 9/0093 700/259 |
| 2015/0127162 A1* | 5/2015 | Gotou .................. | B25J 9/1612 700/259 |
| 2019/0070734 A1* | 3/2019 | Wertenberger ...... | B25J 15/0616 |

(Continued)

*Primary Examiner* — Khoi H Tran
*Assistant Examiner* — Tanner L Cullen
(74) *Attorney, Agent, or Firm* — Hamre, Schumann, Mueller & Larson, P.C.

(57) ABSTRACT

There is provided a method for picking up an object from a bin to be implemented by a robotic arm including a controller and a picking-up module. The method includes: recognizing, by the controller, at least one object in the bin based on an image of an interior of the bin so as to determine a type of each object; determining, by the controller, a score for each object based on the type thereof; determining, by the controller, whether a greatest score among the score(s) of the at least one TBT object is greater than a predetermined value; and by the picking-up module, picking up one of the at least one TBT object that has the greatest score when it is determined that the greatest score is greater than the predetermined value.

17 Claims, 3 Drawing Sheets

(51) Int. Cl.
*G06V 20/10* (2022.01)
*G06V 20/64* (2022.01)

(56) References Cited

U.S. PATENT DOCUMENTS

2019/0337152 A1* 11/2019 Homberg ............... G06V 20/10
2020/0017317 A1* 1/2020 Yap ..................... B65G 47/905
2020/0130935 A1* 4/2020 Wagner ................ B65G 1/1373
2021/0291378 A1* 9/2021 Komoda ............... B25J 9/1697

* cited by examiner

METHOD FOR PICKING UP AN OBJECT FROM A BIN

FIELD

The disclosure relates to a method for picking up an object from a bin, and more particularly to a method for picking up an object from a bin according to a type of the object.

BACKGROUND

A robotic arm is an automatic control equipment that can imitate functions of a human arm to perform tasks such as soldering, assembling, packing, transporting an object, etc., and is extensively used in various workplaces to save human resources and to protect workers from dangerous activities. When performing the task of transporting an object (e.g., a pill bottle), a robotic arm may pick up the object inappropriately, which may cause the object to fall. For example, when the robotic arm picks up a pill bottle by a floating part of a label with the label being partially attached onto the pill bottle, the pill bottle may not be held firmly enough and may fall or even break in the process of transporting the pill bottle.

SUMMARY

Therefore, an object of the disclosure is to provide a method for picking up an object from a bin that can alleviate at least one of the drawbacks of the prior art.

According to one aspect of the disclosure, a method for picking up an object from a bin is to be implemented by a robotic arm including a controller, a kinematic chain that has an end, a scanning module, and a picking-up module that is attached to the end of the kinematic chain. The method includes: a capturing step of capturing, by the scanning module, an image of an interior of the bin; a recognizing step of recognizing, by the controller, at least one to-be-transported (TBT) object in the bin based on the image captured by the scanning module so as to determine a type of each of the at least one TBT object; a scoring step of determining, by the controller, a score for each of the at least one TBT object based on the type thereof; a determining step of determining, by the controller, whether a greatest score among the score(s) of the at least one TBT object is greater than a predetermined value; and a picking-up step of controlling, by the controller, the kinematic chain to move the picking-up module to a position above one of the at least one TBT object that has the greatest score and the picking-up module to pick up the one of the at least one TBT object when it is determined that the greatest score is greater than the predetermined value.

According to another aspect of the disclosure, a method for picking up an object from a bin is to be implemented by a robotic arm including a controller, a kinematic chain that has an end, a scanning module, and a picking-up module that is attached to the end of the kinematic chain. The method includes: a capturing step of the scanning module capturing an image of an interior of the bin; a recognizing step of the controller recognizing a plurality of to-be-transported (TBT) objects in the bin based on the image captured by the scanning module so as to determine a type of each of the TBT objects; a positioning step of the controller determining an altitudinal position of each of the TBT objects in the bin based on the image captured by the scanning module; a scoring step of the controller determining a score for each of the TBT objects by giving the TBT object a first score value based on the altitudinal position thereof and a second score value based on the type thereof, and calculating a value of the score of the TBT object as a sum of the first score value and the second score value; a determining step of the controller determining whether a greatest score among the scores of the TBT objects is greater than a predetermined value; and a picking-up step of the controller controlling the kinematic chain to move the picking-up module to a position above one of the TBT objects that has the greatest score and the picking-up module to pick up the one of the TBT objects when it is determined that the greatest score is greater than the predetermined value.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
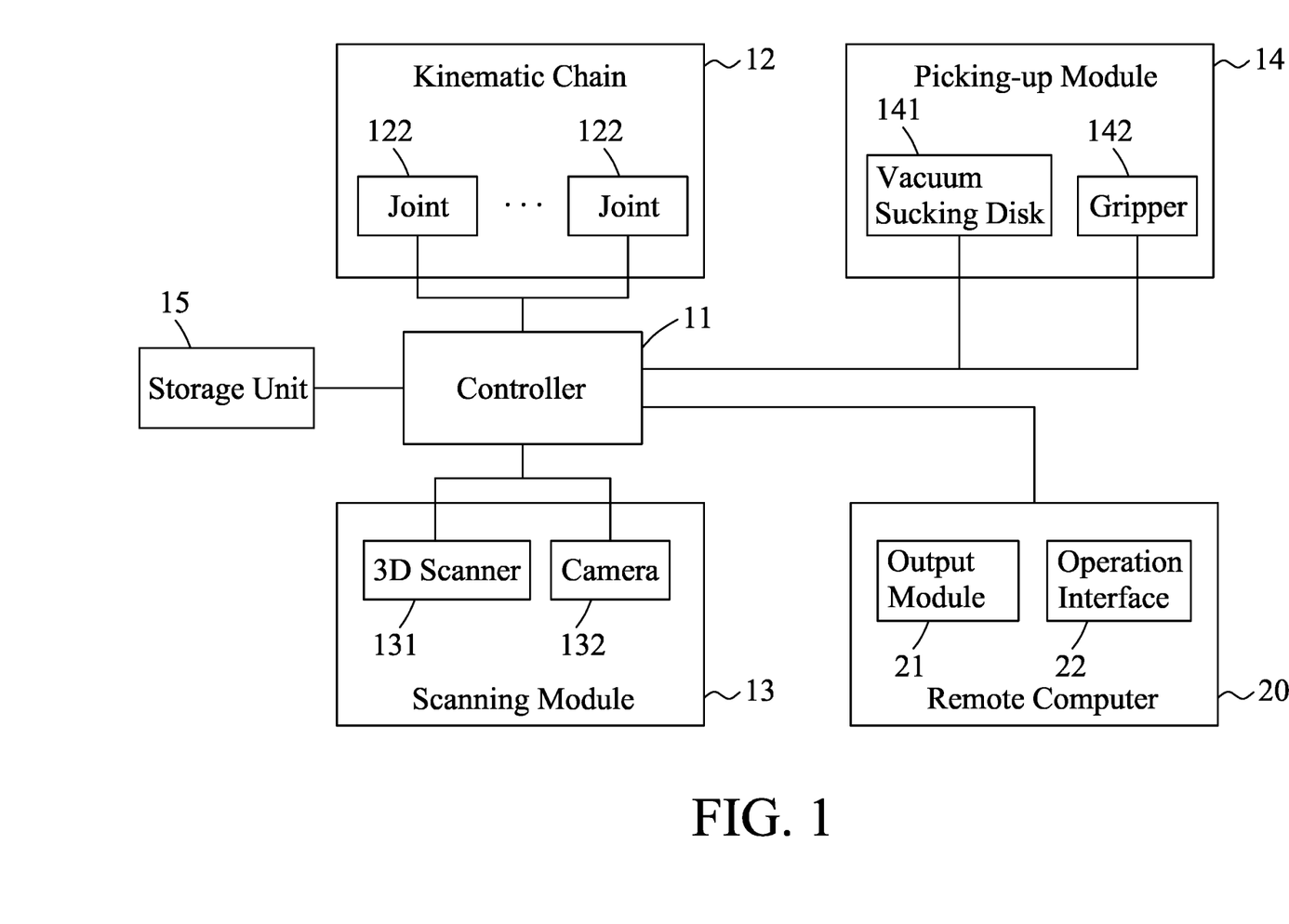
FIG. 1 is a block diagram exemplarily illustrating a robotic arm for picking up an object from a bin according to an embodiment of the disclosure.
Figure 2:
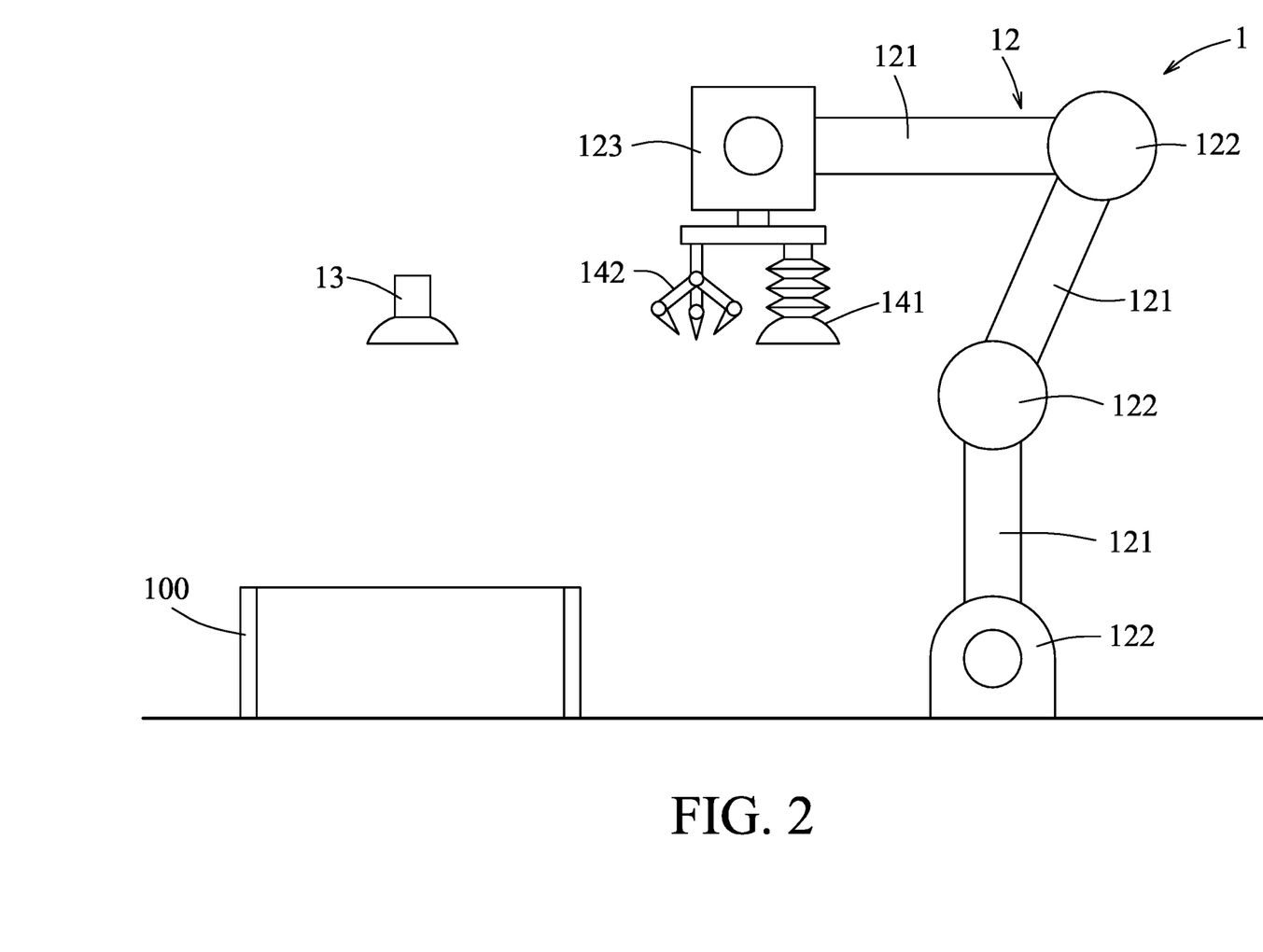
FIG. 2 is a schematic view of the robotic arm.

Referring to FIGS. 1 and 2, a robotic arm 1 is configured to appropriately pick up an object from a bin 100 according to an embodiment of this disclosure. The robotic arm 1 includes a controller 11, a kinematic chain 12, a scanning module 13, a picking-up module 14 and a storage unit 15.

For example, the controller 11 is a microcontroller including, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. The controller 11 is configured to communicate with a remote computer 20 through a wired connection. In some embodiments, the controller 11 may be configured to wirelessly communicate with the remote computer 20. The remote computer 20 includes an output module 21 (e.g., a display) and an operation interface 22 (e.g., a keyboard, a mouse, etc.).

The kinematic chain 12 has a plurality of links 121 connected by joints 122 to provide desired motion, and an end 123 which is a moving end and which allows one or more end effectors to be attached. The joints 122 are electrically connected to and controlled by the controller 11 to move the links 121 so as to provide desired motion.

The scanning module 13 is disposed to face the bin 100. The scanning module 13 includes a 3-dimensional (3D) scanner 131 for constructing a 3D model and a camera 132 for capturing a two-dimensional (2D) image, and is electrically connected to the controller 11 to transmit the 3D model and the 2D image to the controller 11 for subsequent processing. In other embodiments, the scanning module 13 may be attached to the end 123 of the kinematic chain 12.

The picking-up module 14 is attached to the end 123 of the kinematic chain 12, and is moved by the kinematic chain 12. The picking-up module 14 includes a vacuum sucking disk 141 and a gripper 142 electrically connected to and controlled by the controller 11 to pick up an object.

The storage unit 15 is, for example but not limited to, an electrically-erasable programmable read-only memory (EEPROM), a hard disk, a solid-state drive (SSD), or a non-transitory storage medium (e.g., a secure digital memory, flash memory, etc.). The storage unit 15 is electrically connected to the controller 11, and stores instructions that are executable by the controller 11 to implement a method for picking up an object from a bin. Examples of the instructions may include any suitable type of code, such as source code, compiled code, interpreted code, executable code, static code, dynamic code, object-oriented code, visual code, and the like.

Figure 3:
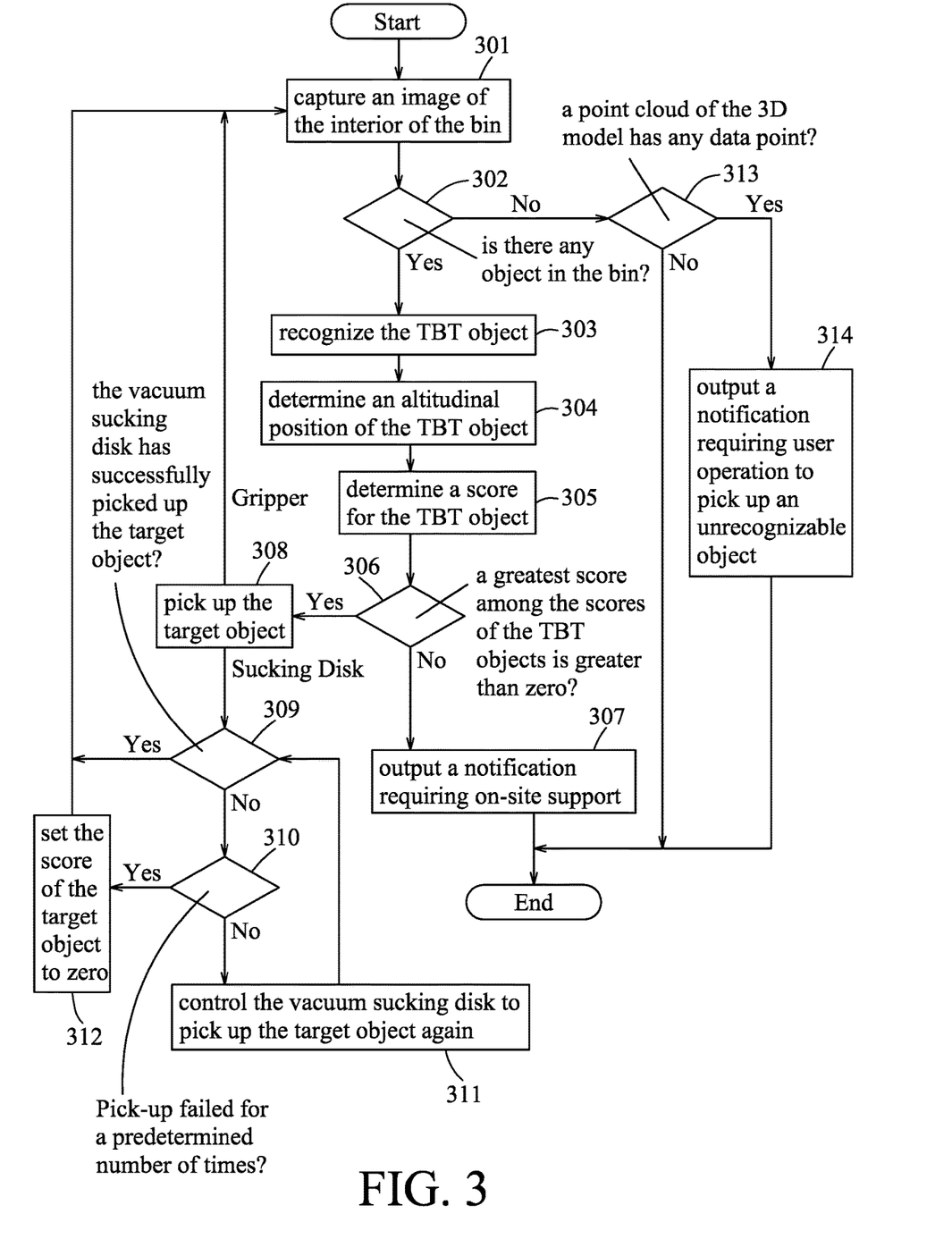
FIG. 3 is a flow chart of a method for picking up an object from a bin according to an embodiment of the disclosure.

Referring to FIG. 3, the method for picking up an object from a bin is implemented, for example, by the robotic arm 1 shown in FIGS. 1 and 2, and includes the following steps.

In step 301, the controller 11 controls the scanning module 13 to capture an image of the interior of the bin 100 by means of the camera 132 and to scan the interior of the bin 100 to construct a 3D model of the interior by means of the 3D scanner 131. In a case that the scanning module 13 is attached to the end 123 of the kinematic chain 12, the controller 11 may first control the kinematic chain 12 to move the scanning module 13 to a position above the bin 100, and then implement step 301 once the scanning module 13 has been moved to the position above the bin 100.

In step 302, the controller 11 determines whether there is any object in the bin 100 based on the image of the interior of the bin 100 captured in step 301. The flow goes to step 303 when it is determined that there is at least one object in the bin 100, and goes to step 313 when otherwise. Each of the at least one object in the bin 100 is considered as a to-be-transported (TBT) object. It should be noted that generally there would be a plurality of TBT objects in the bin 100, and therefore the following steps will be described mainly with respect to plural TBT objects.

In step 303, for each of the TBT objects in the bin 100, the controller 11 recognizes the TBT object based on the image captured by the camera 132 so as to determine a type of the TBT object. In some embodiments, the controller 11 may be configured to recognize the TBT objects in the bin 100 further based on the 3D module constructed by the 3D scanner 131. For each of the TBT objects, the controller 11 is configured to determine whether the TBT object is a cap on a lying bottle, a plastic bag, a box without a label attached thereto, a label attached to a box, a bottle in an upside-down position, a cap that is on a standing (right side up) bottle and that has a flat top surface (hereinafter abbreviated to "a flat cap on a standing bottle"), a floating part of a label with the label being partially attached to another object (hereinafter abbreviated to "a floating label part"), a cap that is on a standing bottle and that has an uneven top surface (hereinafter abbreviated to "an uneven cap on a standing bottle"), a cap that is on a standing bottle and that has a folded sheet attached to a top surface thereof (hereinafter abbreviated to "a sheet-attached cap on a standing bottle"), or a back side of a floating part of a label with the label being partially attached to another objet (hereinafter abbreviated to "a back side of a floating label part").

For example, the controller 11 may include a recognizing module (not shown) for executing an artificial neural network (ANN) or a convolution neural network (CNN) which has been trained in advance to recognize existence of any object in the bin 100 when the image and/or the 3D module is inputted to the ANN/CNN. The ANN/CNN may be established and trained by using any appropriate deep learning technique. In training the ANN/CNN, a large number of samples (including 2D images and 3D models) that contain various objects having various sizes, contours, shapes, colors and/or patterns may be used to construct and improve a deep learning algorithm of the ANN/CNN, such that the trained ANN/CNN can recognize existence of any object presented in an image which is inputted to the ANN/CNN by determining an outline of each of the object(s), if any. Since establishing and training the ANN/CNN relates to known technique, details thereof are not described herein.

The recognizing module may be embodied in: executable software as a set of logic instructions stored in a machine- or computer-readable storage medium of a memory such as random access memory (RAM), read only memory (ROM), programmable ROM (PROM), firmware, flash memory, etc.; configurable logic such as programmable logic arrays (PLAs), field programmable gate arrays (FPGAs), complex programmable logic devices (CPLDs), etc.; fixed-functionality logic hardware using circuit technology such as application specific integrated circuit (ASIC), complementary metal oxide semiconductor (CMOS), transistor-transistor logic (TTL) technology, etc.; or any combination thereof.

In step 304, for each of the TBT objects, the controller 11 further determines an altitudinal position of the TBT object in the bin 100 based on the image and/or the 3D module. The altitudinal position of the TBT object is a height of the TBT object from a bottom of the bin 100. It should be noted that steps 303 and 304 may be implemented simultaneously.

In step 305, for each of the TBT objects, the controller 11 determines a score of the TBT object based on the type and the altitudinal position thereof. Specifically, the controller 11 first gives the TBT object a first score value based on the altitudinal position thereof and a second score value based on the type thereof, and then calculates a value of the score of the TBT object as a sum of the first score value and the second score value. According to some embodiments, the first score value is directly proportional to a height of the altitudinal position; that is to say, the higher the altitudinal position of the TBT object, the higher the first score value of the TBT object. As for the second score value for each of the TBT objects, the controller 11 gives the TBT object a first value as the second score value when the TBT object is determined to be a cap on a lying bottle, a second value when the TBT object is determined to be a plastic bag, a third value when the TBT object is determined to be a box without a label attached thereto, a fourth value when the TBT object is determined to be a label attached to a box, a fifth value when the TBT object is determined to be a bottle in an upside-down position, and a sixth value when the TBT object is determined to be a flat cap on a standing bottle. In some embodiments, the first to sixth values are positive values, and from high to low are the first value, the second value, the third value, the fourth value, the fifth value and the sixth value.

It should be noted that, when one of the TBT objects is determined to be one of a floating label part, an uneven cap on a standing bottle, a sheet-attached cap on a standing bottle, and a back side of a floating label part in step 303, the controller 11 gives the TBT object a score of zero regardless of the altitudinal position of the TBT object in step 305.

Then, in step 306, the controller 11 determines whether a greatest score among the scores of the TBT objects is greater than a predetermined value (e.g., zero in this embodiment). The flow goes to step 307 when it is determined that the greatest score is not greater than the predetermined value, and goes to step 308 when otherwise.

In step 307, the controller 11 outputs a first notification through the output module 21 of the remote computer 20 to notify an operator that on-site support is needed. When the greatest score is not greater than zero (the predetermined value), it means that all the TBT objects have a score of zero and are each a floating label part, an uneven cap on a standing bottle, a sheet-attached cap on a standing bottle, or a back side of a floating label part. It should be noted that these types of objects may not be picked up firmly by either the vacuum sucking disk 141 or the gripper 142, and therefore on-site support from an operator will be needed.

In step 308, the controller 11 controls the kinematic chain 12 to move the picking-up module 14 to a position above one of the TBT objects that has the greatest score (referred to as "target object" hereinafter), and then controls the picking-up module 14 to pick up the target object. Specifically, the controller 11 controls the gripper 142 to pick up the target object when the target object is determined to be a cap on a lying bottle; the controller 11 controls the vacuum sucking disk 141 to pick up the target object when the target object is determined to be a plastic bag, a box without a label attached thereto, a label attached to a box, a bottle in an upside-down position, or a flat cap on a standing bottle. According to some embodiments, when the controller 11 determines to pick up the target object (i.e., a cap on a lying bottle) with the gripper 142, the controller 11 further determines, based on a size of the target object, a spreading extent which the gripper 142 should spread by and which is enough to grip the target object. The controller 11 may be configured to determine the size of the target object based on a point cloud of the 3D model representing the target object.

In the case that the controller 11 controls the gripper 142 to pick up the target object, the flow goes back to step 301 after transportation of the target object has been completed. On the other hand, in the case that the controller 11 controls the vacuum sucking disk 141 to pick up the target object, the flow goes to step 309 after the robotic arm 1 tries to pick up the target object by the vacuum sucking disk 141.

In step 309, the controller 11 determines whether the vacuum sucking disk 141 has successfully picked up the target object. When it is determined that the vacuum sucking disk 141 failed to pick up the target object, the flow goes to step 310 to determine whether the vacuum sucking disk 141 has failed to pick up the target object for a predetermined number of times (e.g., two times). When it is determined that the number of times the vacuum sucking disk 141 has failed to pick up the target object has not reached the predetermined number of times, the flow goes to step 311 in which the controller 11 controls the vacuum sucking disk 141 to pick up the target object again, after which the flow goes back to step 309. When it is determined that the vacuum sucking disk 141 failed to pick up the target object for the predetermined number of times, the flow goes to step 312 in which the controller 11 sets the score of the target object to zero, after which the flow goes back to step 301. It should be noted that the zero score of the target object set in step 310 will remain zero in every subsequent iteration of step 305. In the case that the vacuum sucking disk 141 has successfully picked up the target object, the flow goes back to step 301 after transportation of the target object has been completed.

When it is determined that there is no object in the bin 100, the controller 11 further determines, in step 313, whether a point cloud of the 3D model constructed by the 3D scanner 131 in step 301 has any data point. When it is determined that the point cloud of the 3D model does not have any data point, it means that the bin 100 is surely empty and the method is terminated. When it is determined that the point cloud of the 3D model has at least one data point, it means that the determination made in step 302 might be incorrect and the bin 100 may actually have one or more unrecognizable objects therein, and the flow goes to step 314.

In step 314, the controller 11 outputs a second notification through the output module 21 of the remote computer 20 to notify the operator that user operation to pick up an unrecognizable object in the bin 100 is needed. Then, the operator may operate the operation interface 22 of the remote computer 20 to input to the controller 11 a command indicating a position and an orientation of the unrecognizable object in the bin 100, so that the controller 11 can control the kinematic chain 12 and the picking-up module 14 to pick up the unrecognizable object. Furthermore, the image(s) of the unrecognizable object can be inputted to the ANN for further training of the ANN.

To sum up, by implementing the method according to this disclosure, the robotic arm 1 will automatically pick up only object(s) that can be firmly held by the picking-up module 14, and not automatically pick up any object that may not be firmly held by the picking-up module 14. Further, the robotic arm 1 can appropriately select the vacuum sucking disk 141 or the gripper 142 to pick up an object according to the type of the object. Accordingly, the method according to this disclosure can prevent an object from falling off of the picking-up module 14 during transportation of the object by the robotic arm 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for picking up an object from a bin to be implemented by a robotic arm including a controller, a kinematic chain that has an end, a scanning module, and a picking-up module that is attached to the end of the kinematic chain, the method comprising:

a capturing step of capturing, by the scanning module, an image of an interior of the bin;

a recognizing step of recognizing, by the controller, at least one to-be-transported (TBT) object in the bin based on the image captured by the scanning module so as to determine a type of each of the at least one TBT object;

a scoring step of determining, by the controller, a score for each of the at least one TBT object based on the type thereof;

a determining step of determining, by the controller, whether a greatest score among the score(s) of the at least one TBT object is greater than a predetermined value; and a picking-up step of controlling, by the controller, the kinematic chain to move the picking-up module to a position above one of the at least one TBT object that has the greatest score and the picking-up module to pick up the one of the at least one TBT object when it is determined that the greatest score is greater than the predetermined value, wherein the recognizing step is to, for each TBT object of the at least one TBT object, determine whether the TBT object is a cap on a lying bottle, a plastic bag, a box without a label attached thereto, a label attached to a box, a bottle in an upside-down position, or a cap that is on a standing bottle and that has a flat top surface, wherein the scoring step is to, for each TBT object of the at least one TBT object, give the TBT object a score of a positive value when the TBT object is determined to be one of a cap on a lying bottle, a plastic bag, a box without a label attached thereto, a label attached to a box, a bottle in an upside-down position, and a cap that is on a standing bottle and that has a flat top surface.

2. The method of claim 1, wherein the scoring step is to, for each TBT object of the at least one TBT object, give the TBT object a score of a first value when the TBT object is determined to be a cap on a lying bottle, a second value when the TBT object is determined to be a plastic bag, a third value when the TBT object is determined to be a box without a label attached thereto, a fourth value when the TBT object is determined to be a label attached to a box, a fifth value when the TBT object is determined to be a bottle in an upside-down position, and a sixth value when the TBT object is determined to be a cap that is on a standing bottle and that has a flat top surface, wherein the first to sixth values from high to low are the first value, the second value, the third value, the fourth value, the fifth value and the sixth value.

3. The method of claim 1, the picking-up module including a vacuum sucking disk and a gripper, wherein the picking-up step is to control the gripper to pick up said one of the at least one TBT object when said one of the at least one TBT object is determined to be a cap on a lying bottle, and to control the vacuum sucking disk to pick up said one of the at least one TBT object when said one of the at least one TBT object is determined to be one of a plastic bag, a box without a label attached thereto, a label attached to a box, a bottle in an upside-down position, and a cap that is on a standing bottle and that has a flat top surface.

4. The method of claim 3, further comprising steps of, when the controller controls the vacuum sucking disk to pick up said one of the at least one TBT object:

determining, by the controller, whether the vacuum sucking disk has successfully picked up said one of the at least one TBT object;

when it is determined that the vacuum sucking disk failed to pick up said one of the at least one TBT object, determining, by the controller, whether the vacuum sucking disk has failed to pick up said one of the at least one TBT object for a predetermined number of times;

when it is determined that the number of times the vacuum sucking disk has failed to pick up the target object has not reached the predetermined number of times, by the controller, controlling the vacuum sucking disk to pick up said one of the at least one TBT object again, and repeating the step of determining whether the vacuum sucking disk has successfully picked up said one of the at least one TBT object; and when it is determined that the vacuum sucking disk has failed to pick up said one of the at least one TBT object for the predetermined number of times, setting, by the controller, the score of said one of the at least one TBT object to zero, and repeating the capturing step, the recognizing step, the scoring step, the determining step and the picking-up step.

5. The method of claim 1, wherein the recognizing step is further to, for each TBT object of the at least one TBT object, determine whether the TBT object is a floating part of a label with the label being partially attached to another object, a cap that is on a standing bottle and that has an uneven top surface, a cap that is on a standing bottle and that has a folded sheet attached to a top surface thereof, or a back side of a floating part of a label with the label being partially attached to another object, wherein the scoring step is further to, for each TBT object of the at least one TBT object, give the TBT object a score of zero when the TBT object is determined to be one of a floating part of a label with the label being partially attached to another object, a cap that is on a standing bottle and that has an uneven top surface, a cap that is on a standing bottle and that has a folded sheet attached to a top surface thereof, and a back side of a floating part of a label with the label being partially attached to another object.

6. The method of claim 1, further comprising a positioning step of determining, by the controller, an altitudinal position of each of the at least one TBT object in the bin based on the image captured by the scanning module, wherein the scoring step is to, for each TBT object of the at least one TBT object, give the TBT object a first score value based on the altitudinal position thereof and a second score value based on the type thereof, and calculate a value of the score of the TBT object as a sum of the first score value and the second score value.

7. The method of claim 6, wherein the first score value is directly proportional to the altitudinal position.

8. The method of claim 6, wherein the second score value is a first value when the TBT object is determined to be a cap on a lying bottle, a second value when the TBT object is determined to be a plastic bag, a third value when the TBT object is determined to be a box without a label attached thereto, a fourth value when the TBT object is determined to be a label attached to a box, a fifth value when the TBT object is determined to be a bottle in an upside-down position, and a sixth value when the TBT object is determined to be a cap that is on a standing bottle and that has a flat top surface, wherein the first to sixth values from high to low are the first value, the second value, the third value, the fourth value, the fifth value and the sixth value.

9. The method of claim 1, further comprising, between the capturing step and the recognizing step, steps of:

determining, by the controller, whether there is any object in the bin based on the image captured by the scanning module;

when it is determined that there is at least one object in the bin, considering the at least one object as the at least one TBT object and implementing the recognizing step on each of the at least one object.

10. The method of claim 9, the controller being electrically connected to an output module, the scanning module including a 3-dimensional (3D) scanner and a camera, wherein the capturing step includes capturing a two-dimensional (2D) image of the interior of the bin and scanning the interior of the bin to construct a 3D model of the interior of the bin, and the recognizing step is to recognize the at least one TBT object based on the 2D image and the 3D model, wherein the method further comprises steps of when it is determined that there is no object in the bin, determining, by the controller, whether a point cloud of the 3D model has any data point, when it is determined that the point cloud has at least one data point, outputting, by the controller, a notification through the output module to notify an operator that user operation to pick up an unrecognizable object in the bin is needed.

11. A method for picking up an object from a bin to be implemented by a robotic arm including a controller, a kinematic chain that has an end, a scanning module, and a picking-up module that is attached to the end of the kinematic chain, the method comprising:

a capturing step of the scanning module capturing an image of an interior of the bin;

a recognizing step of the controller recognizing a plurality of to-be-transported (TBT) objects in the bin based on the image captured by the scanning module so as to determine a type of each of the TBT objects;

a positioning step of the controller determining an altitudinal position of each of the TBT objects in the bin based on the image captured by the scanning module;

a scoring step of the controller determining a score for each of the TBT objects based on the altitudinal position and the type thereof, wherein the scoring step includes, for each of the TBT objects, giving a first score value to the TBT object based on the altitudinal position of the TBT object, giving a second score value to the TBT object based on the type of the TBT object, and calculating a value of the score of the TBT object as a sum of the first score value and the second score value;

a determining step of the controller determining whether a greatest score among the scores of the TBT objects is greater than a predetermined value; and a picking-up step of the controller controlling the kinematic chain to move the picking-up module to a position above one of the TBT objects that has the greatest score and the picking-up module to pick up the one of the TBT objects when it is determined that the greatest score is greater than the predetermined value, wherein the scoring step includes, for each of the TBT objects, giving a first score value to the TBT object based on the altitudinal position of the TBT object, giving a second score value to the TBT object based on the type of the TBT object, and calculating a value of the score of the TBT object as a sum of the first score value and the second score value, wherein the recognizing step is to, for each of the TBT objects, determine whether the TBT object is a cap on a lying bottle, a plastic bag, a box without a label attached thereto, a label attached to a box, a bottle in an upside-down position, or a cap that is on a standing bottle and that has a flat top surface, wherein the second score value is a first value when the TBT object is determined to be a cap on a lying bottle, a second value when the TBT object is determined to be a plastic bag, a third value when the TBT object is determined to be a box without a label attached thereto, a fourth value when the TBT object is determined to be a label attached to a box, a fifth value when the TBT object is determined to be a bottle in an upside-down position, and a sixth value when the TBT object is determined to be a cap that is on a standing bottle and that has a flat top surface, and wherein the first to sixth values from high to low are the first value, the second value, the third value, the fourth value, the fifth value and the sixth value.

12. The method of claim 11, wherein the first score value is directly proportional to a height of the altitudinal position.

13. The method of claim 11, the picking-up module including a vacuum sucking disk and a gripper, wherein the picking-up step is to control the gripper to pick up said one of the TBT objects when said one of the TBT objects is determined to be a cap on a lying bottle, and to control the vacuum sucking disk to pick up said one of the TBT objects when said one of the TBT objects is determined to be one of a plastic bag, a box without a label attached thereto, a label attached to a box a bottle in an upside-down position, and a cap that is on a standing bottle and that has a flat top surface.

14. The method of claim 13, further comprising steps of, when the controller controls the vacuum sucking disk to pick up said one of the TBT objects:

determining, by the controller, whether the vacuum sucking disk has successfully picked up said one of the TBT objects;

when it is determined that the vacuum sucking disk failed to pick up said one of the TBT objects, determining, by the controller, whether the vacuum sucking disk has failed to pick up said one of the TBT objects for a predetermined number of times;

when it is determined that the number of times the vacuum sucking disk has failed to pick up the target object has not reached the predetermined number of times, by the controller, controlling the vacuum sucking disk to pick up said one of the TBT objects again, and repeating the step of determining whether the vacuum sucking disk has successfully picked up said one of the TBT objects; and when it is determined that the vacuum sucking disk has failed to pick up said one of the TBT objects for the predetermined number of times, setting, by the controller, the score of said one of the TBT objects to zero, and repeating the capturing step, the recognizing step, the scoring step, the determining step and the picking-up step.

15. The method of claim 11, further comprising, between the capturing step and the recognizing step, steps of:

determining, by the controller, whether there is any object in the bin based on the image captured by the scanning module;

when it is determined that there is at least one object in the bin, considering each of the at least one object as one of the TBT objects and implementing the recognizing step on each of the at least one object.

16. The method of claim 15, the controller being electrically connected to an output module, the scanning module including a 3-dimensional (3D) scanner and a camera,     wherein the capturing step includes capturing a two-dimensional (2D) image of the interior of the bin and scanning the interior of the bin to construct a 3D model of the interior of the bin, and the recognizing step is to recognize the TBT objects based on the 2D image and the 3D model,     wherein the method further comprises steps of     when it is determined that there is no object in the bin, determining, by the controller, whether a point cloud of the 3D model has any data point,     when it is determined that the point cloud has at least one data point, outputting, by the controller, a notification through the output module to notify an operator that user operation to pick up an unrecognizable object in the bin is needed.

17. A method for picking up an object from a bin to be implemented by a robotic arm including a controller, a kinematic chain that has an end, a scanning module, and a picking-up module that is attached to the end of the kinematic chain, the method comprising:

a capturing step of the scanning module capturing an image of an interior of the bin;

a recognizing step of the controller recognizing a plurality of to-be-transported (TBT) objects in the bin based on the image captured by the scanning module so as to determine a type of each of the TBT objects;

a positioning step of the controller determining an altitudinal position of each of the TBT objects in the bin based on the image captured by the scanning module;

a scoring step of the controller determining a score for each of the TBT objects based on the altitudinal position and the type thereof;

a determining step of the controller determining whether a greatest score among the scores of the TBT objects is greater than a predetermined value; and     a picking-up step of the controller controlling the kinematic chain to move the picking-up module to a position above one of the TBT objects that has the greatest score and the picking-up module to pick up the one of the TBT objects when it is determined that the greatest score is greater than the predetermined value,     wherein the recognizing step is to, for each of the TBT objects, determine whether the TBT object is a floating part of a label with the label being partially attached to another object, a cap that is on a standing bottle and that has an uneven top surface, a cap that is on a standing bottle and that has a folded sheet attached to a top surface thereof, or a back side of a floating part of a label with the label being partially attached to another object,     wherein, for each of the TBT objects, the scoring step is to give the TBT object a score of zero when the TBT object is determined to be one of a floating part of a label with the label being partially attached to another object, a cap that is on a standing bottle and that has an uneven top surface, a cap that is on a standing bottle and that has a folded sheet attached to a top surface thereof, and a back side of a floating part of a label with the label being partially attached to another object.

\* \* \* \* \*